Feb. 11, 1969  J. B. MASTERSON  3,427,393
GASTIGHT PLUGS FOR COMMUNICATION CABLES
Filed Nov. 3, 1966

INVENTOR
JOSEPH B. MASTERSON
BY Sandoe, Neill,
Schottler & Wikstrom
ATTORNEYS.

United States Patent Office 3,427,393
Patented Feb. 11, 1969

3,427,393
GASTIGHT PLUGS FOR COMMUNICATION CABLES
Joseph B. Masterson, Carteret, N.J., assignor to General Cable Corporation, New York, N.Y., a corporation of New Jersey
Filed Nov. 3, 1966, Ser. No. 591,808
U.S. Cl. 174—23     13 Claims
Int. Cl. H02g 15/20

ABSTRACT OF THE DISCLOSURE

An electrical cable is plugged so that it can be pressurized along runs of the cable between plugs. A barrier is first formed across the interior of the cable by pouring in a foaming material. A harder, stronger plug material, which is an elastomer, is melted and poured into the cable alongside the barrier which prevents longitudinal flow of the melted elastomer while it is cooling and solidifying.

Background and Summary of the Invention

This invention relates to electric cables and more especially to communication cables having the inside of the cable plugged at spaced locations so that the regions between plugs can be pressurized.

It is a common practice to plug the ends of electric communication cables with a fluid resin compound such as epoxy, polyurethane, or similar material which sets to a solid state in a reasonable amount of time. The concept is to fill the interstices between conductors and any clearance between the conductors and a surrounding protecting covering. With paper-insulated cables, the plugging liquid compound impregnates the paper. The liquid compound, after solidifying by curing, forms a solid plug which prevents gas from escaping when the cable is pressurized.

The methods used presently in the art have the shortcoming that none of them is sufficiently reliable and the great majority of the pressure plugs leak. These leaks are of such a nature that it is necessary to pump into the cable network an additional supply of gas to compensate for the leaks.

The main reason for leaks occurring around the cable plugs is the insufficient or unreliable distribution of the plugging compound in the cable cross section. The cable core provides little resistance to flow along the core. When the plugging compound is introduced into the cable, it tends to flow along the available paths between conductors and between the protecting covering and the conductors. It distributes itself according to the resistance to fluid flow, penetrating along the center of the cable without completely filling the gaps or clearance between the outer tapes, shield and jacket and thus leaving paths for the escape of gas.

Various methods have been tried to overcome this problem such as squeezing the cross section of the cable and placing fibres in the plugging compound so that it can not flow through restricted spaces, but such methods have not been sufficiently reliable to insure that the plug will be gas-tight when installed.

It is an object of this invention to provide an improved method of plugging electric cables and to obtain plugs that are gas-tight and consistently reliable for retaining the gas under the pressures used in cables, generally about 10 pounds per square inch.

It is another object of this invention to provide barrier partitions within the cable which are not adequate to withstand the gas pressure but which prevent longitudinal flow of a plugging compound when this compound is introduced into the cable in a flowable condition and while the plugging compound is setting, to form a solid, gastight plug.

In its preferred embodiment, this invention forms a barier partition by introducing into the cable in a liquid condition, a foam-producing mixture which spreads through all of the interstices between the conductors and into any clearances between the conductors and the surrounding shield or jacket as the mixture foams. When the foam solidifies, it forms a spongy dam that prevents longitudinal flow of the plugging compound along the conductors, and that confines the plugging compound to a predetermined length of the inside of the cable. This results in a complete filling of the cross section of the interior of the cable by the plug and prevents any escape of gas used to pressurize the cable. The invention is suitable for forming plugs at the ends of cables and also at intermediate locations along the length of a cable. It can be used to plug cables that are either horizontal or vertical at the time that the plugging compound is introduced into the cable.

Other objects, features and advantages of the invention will appear or be pointed out as the description proceeds.

Brief description of the drawing

In the drawing, forming a part hereof, in which like reference characters indicate corresponding parts in all the views.

Description of preferred embodiment

Figure 3:
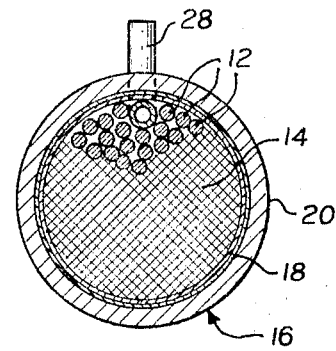
FIGURE 3 is an enlarged sectional view taken on the line 3—3 of FIGURE 1 and showing a section through one of the barrier partitions.

A cable 10 is formed with a plurality of insulated electrical conductors 12 (FIGURE 3) which form a cable core indicated generally by the reference character 14. The core is surrounded by a protecting covering indicated generally by the reference character 16 and consisting of a shielding layer 18 and an outer jacket 20.

At the location where the cable is to be plugged, there is an interruption or opening 24 in the protecting covering 16 to provide access to the interior of the cable. Two small tubes 26 and 28 are inserted into the cable 10 at opposite ends of the opening 24 and the inserted ends of the tubes 26 and 28 are moved along the interior of the cable 10 to locations beyond the opening 24 where foam dams are to be located.

Figure 1:
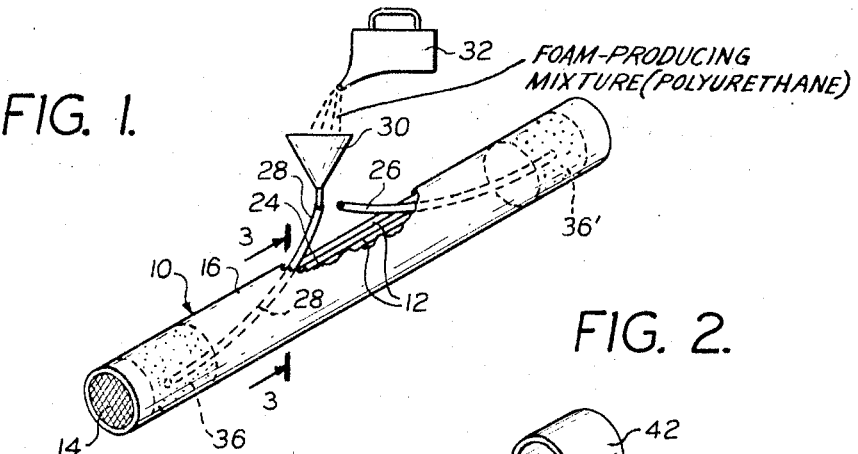
FIGURE 1 is a diagrammatic, isometric view of a portion of an electric cable and illustrating the way in which the cable is prepared for forming the barrier partition.

A mixture for producing foam is then poured into each of the tubes 26 and 28 by means of a funnel in the tube and with the mixture in a liquid condition. FIGURE 1 shows a funnel 30 inserted into the tube 28 and having a foam-producing mixture poured into it from a container 32. The liquid discharges from the end of the tube 28 and as it foams it enters the interstices in the core 14 between adjacent conductors and fills any clearances between the core and the protecting covering 16. The foam advances radially and longitudinally from the end of the tube 16 and forms a spongy dam or foam partition 36, which extends across the entire interior of the cable, but which is not strong enough to resist the gas pressure that is used in pressurized cables. A similar foam partition 36′ is formed in the cable at the end of the tube 26 when the foam mixture is poured into that tube.

The tubes 26 and 28 are inserted far enough into the cable 10 beyond the opening 24 to produce foam partitions 36 and 36' which do not reach as far as the limits of the opening 24. Thus there are portions of the interior of the cable 10, beyond the opening 24, for receiving the compound which forms the gastight plug.

Figure 2:
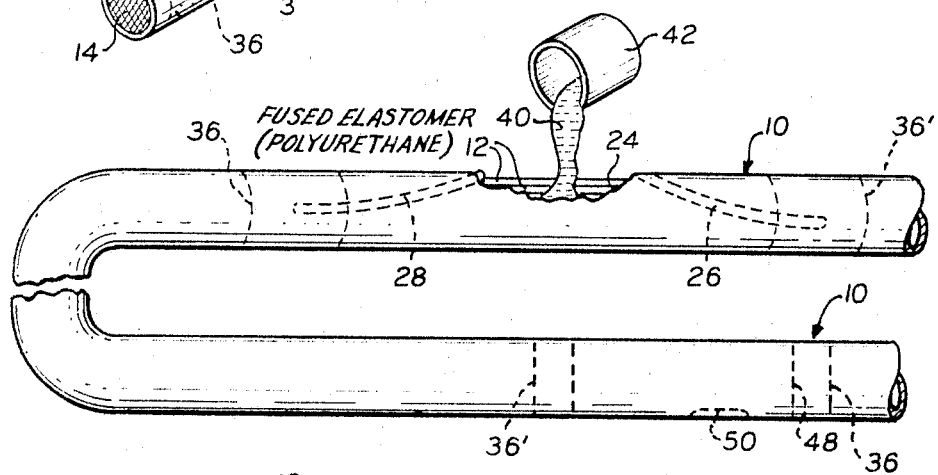
FIGURE 2 is a diagrammatic view showing the pouring of plugging compound into the cable after the barrier partitions have been formed.

FIGURE 2 shows plugging compound 40 being poured from a container 42 through the opening 24 in the top of the cable 10. The tubes 26 and 28 can be removed before introducing the plugging compound 40 into the cable but this is usually not done because it may injure the foam partitions 36 and 36'. It is preferable to cut off the tubes 26 and 28 adjacent to the limits of the opening 24. These tubes 26 and 28 can then be plugged or they can be pulled down into the space which is to be filled with the plugging compound 40. In this latter case, the compound 40 plugs the tubes 26 and 28.

Sufficient compound 40 is poured into the space between the foam partitions 36 and 36' to completely fill the space both longitudinally and radially. After the compound has set, the opening 24 is closed; but the tightness with which this opening is closed is not critical because the plug formed by the compound 40 forms a gastight seal in the cable 10 beyond both ends of the opening 24. The conductors 12 within the space between the foam barriers 36 and 36' are encapsulated by the plugging compound 40 after it has set.

It is advantageous to have plugs at longitudinally spaced regions along the cable 10 so that if a leak develops at any location, gas can escape from only the region between the two plugs that are closest to the leak and the rest of the cable remains pressurized. FIGURE 2 shows an extended portion of the cable 10 with a plug 48 located between foam stations 36 and 36' and made in the same way as already described. The opening through which the foam mixture and the plugging compound were introduced for the plug 48 has been closed in FIGURE 2 and its location is indicated in dotted lines and is designated by the reference character 50.

Figure 4:
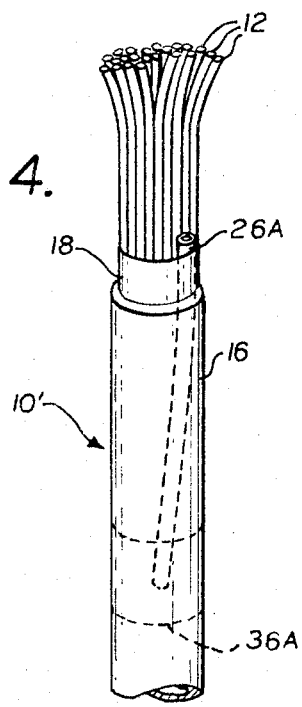
FIGURE 4 is a diagrammatic view showing the way in which the invention is applied to a vertically extending cable.

FIGURE 4 shows the way in which the invention is applied to a cable 10' which is in a vertical position. This is particularly suitable for use when forming plugs at the ends of a cable since it requires only one foam partition 36A. A tube 26A is used to introduce a foam-producing mixture into a region back from the end of the protecting covering 16 and after the foam has expanded radially and longitudinally to form the low-density partitions 36A, plugging compound is poured into the upper end of the cable 10' to fill the space between the foam partition 36A and the upper end of the protecting covering on the cable. Some of the plugging compound is poured into the tube 26A if the tube is not removed prior to introduction of the plugging compound into the cable.

Although the invention has been described thus far with the plugging compound introduced into the cable as a liquid, it will be understood that it can be injected into the cable under pressure with a gun; and while this permits the use of a high-viscosity compound, it must still be in a flowable condition.

The longitudinal length of each of the foam barrier partitions is preferably at least one quarter of the length of the plug 48.

The particular materials used to make the low-density partitions 36 and 36', and to make the plug 48, must be compatible with the insulation on the core and with the protecting covering 16 that surrounds the core. Various materials can be used. The preferred materials are polyurethane compounds. Exceptionally good results have been obtained in practice with a polyurethane mixture to which water is added to produce the foam barriers or partitions 36 and 36', and with a polyurethane mixture to which no water is added, for the plugging compound 40.

The mixture for producing the foam can be a mixture of approximately equal parts by weight of Vorite 626 and Polycin 645, both products being manufactured by the Baker Castor Oil Company of Bayonne, N.J. Vorite is the trademark of the Baker Caster Oil Company for liquid ricinoleate polyester/diisocyanate prepolymers which are available in different densities and viscosities. The Vorite 626 is of a blue-green color with a specific gravity at 25° C. of 1.171 and with viscosity at 25° C. poise 16.7 and at 60° C. poise 1.23.

Polycin is the trademark for curing polyols which serve as hardeners for the Vorite, and they are hydroxyl-terminated compounds for converting the prepolymer to a solid elastomer. The Polycin 645 is yellow; has a specific gravity at 25° C. of .972 and viscosity at 25° C. poise 3.70 and at 60° poise .58.

The Vorite-Polycin polyurethane systems are based on ricinoleate polyols derived from castor oil. These new polyols differ chemically from polyester and polyether polyols previousy used in other preparation of urethanes. The ricinoleates have fewer ester groups than polyesters and contain no ether linkages, as found in polyethers. They are, therefore, more hydrolytically stable than prior polyols. Since the ricinoleate polyols are derived from castor oil, they retain the excellent electrical properties of this dielectric oil and add to it the outstanding features in herent in the polyurethanes to produce superior potting and encapsulation compounds. These systems offer the following advantages over other polyurethanes; lower stress at high hardness; better moisture repellency; better aging characteristics; lower dielectric constant and dissipation factors; lower exotherm; better shock absorption; less sensitive to moisture and consequent gassing; better storage stability; controllable cure rates; and lower cost.

The preferred embodiment of the invention has been illustrated and described, but changes and modifications can be made and some features may be used in different combinations without departing from the invention as defined in the claims.

What is claimed is:

1. The method of forming a gastight plug in an electric cable having a core composed of a plurality of insulated conductors, the core being surrounded by a protecting covering including a jacket, which method comprises forming a low-density barrier in situ within the the jacket and with the barrier blocking clearance between adjacent conductors in the jacket and between the core and the protecting covering at a location where there is an interruption in the protecting covering, introducing a higher density and stronger plugging compound into the cable adjacent to the barrier through said interception and with the plugging compound in a flowable condition, and using the barrier to hold the flowable plugging compound against longitudinal flow in the cable until the plugging compound hardens and forms a solid permanent plug across the full cross section within the cable.

2. The method described in claim 1 characterized by forming the barrier by injecting a liquid foaming mixture into the cable at a location beyond said interruption and where the protecting covering is continuous around the entire circumference of the core.

3. The method described in claim 2 characterized by injecting liquid foaming mixture into the cable at locations longitudinally spaced from one another along the length of the cable and beyond opposite ends of the interruption in the protecting covering, and introducing the plugging compound into the cable by pouring it through the interruption in the protecting covering and into the space between the barriers.

4. The method described in claim 3 characterized by maintaining the cable in a substantially horizontal condition with the interruption in the protecting covering at the top of the cable, and closing the interruption in the protecting covering after the plugging compound has been placed in the cable.

5. The method described in claim 1 characterized by forming a barrier on one side and only one side of an opening into the cable, and holding the cable in a substantially vertical position while introducing the plugging compound into the cable.

6. The method described in claim 1 characterized by mixing water and a polyurethane compound together to form a foam that constitutes the barrier, and introducing polyurethane compound without water into the cable to form the plug.

7. The method described in claim 4 characterized by filling all of the clearances between the foam barriers with the plugging compound.

8. An electric cable including a plurality of insulated electrical conductors constituting a core, a protecting covering around the core adapted to receive a pressurizing fluid, a low-density barrier partition in the cable providing a liquid dam but of less strength than necessary to withstand the pressure of said pressurizing fluid with which the cable is intended to be used, and a gastight plug in the cable adjacent to the barrier and of substantially greater strength than the pressure of said pressurizing fluid for dividing the interior of the cable into separate pressurized zones, both the barrier and the plug being made of solid material.

9. An electric cable including a plurality of insulated electrical conductors constituting a core, a protecting covering around the core adapted to receive a pressurizing fluid, a low-density barrier partition in the cable providing a liquid dam but of less strength than necessary to withstand the pressure of said pressurizing fluid with which the cable is intended to be used, and a gastight plug in the cable adjacent to the barrier and of substantially greater strength than the pressure of said pressurizing fluid for dividing the interior of the cable into separate pressurized zones, characterized by there being two low density barriers in the cable at longitudinally spaced locations, and the plug being of solid material harder than the barriers and of a size to fill the cross section within the cable and to extend for the full distance between the barriers.

10. The electric cable described in claim 9 characterized by each of the barriers having a length equal to at least one quarter the length of the plug.

11. An electric cable including a plurality of insulated electrical conductors constituting a core, a protecting covering around the core, a low-density barrier partition in the cable, and a gastight plug in the cable adjacent to the barrier and of substantially greater strength than the barrier for dividing the interior of the cable into separate pressurized zones, characterized by the cable being a communication cable, the protecting covering including a shielding around the core and an outer jacket over the shielding, the barrier being a foam, and the plug being a solid elastomer.

12. The electric cable described in claim 11 characterized by the barrier partition being made of foamed polyurethane compound and the plug being a polyurethane compound of substantially greater density than the barrier.

13. The electric cable described in claim 12 characterized by the barrier being a mixture of approximately equal parts by weight of ricinoleate/diisocyanate prepolymers of a blue-green color with a specific gravity at 25° C. of 1.171 and with a viscosity at 25° C. poise 16.7 and at 60° poise 1.23 and a hydroxyl-terminated hardener for converting the prepolymer to a solid elastomer, said hardener having a viscosity at 25° C. poise 3.70 and at 60° poise .58, to which prepolymer and hardener approximately 1% of water has been added.

References Cited

UNITED STATES PATENTS

| 1,769,524 | 7/1930 | Mample | 156—48 X |
| 3,248,472 | 4/1966 | Montesano | 174—23 |
| 3,328,512 | 6/1967 | Lembke et al. | 29—629 X |

LEWIS H. MYERS, *Primary Examiner.*

A. T. GRIMLEY, *Assistant Examiner.*

U.S. Cl. X.R.

174—76, 110; 264—45

UNITED STATES PATENT OFFICE
CERTIFICATE OF CORRECTION

Patent No. 3,427,393  February 11, 1969

Joseph B. Masterson

It is certified that error appears in the above identified patent and that said Letters Patent are hereby corrected as shown below:

Column 5, line 37, after "distance" insert -- between the barriers --; line 39, cancel "between the barriers".

Signed and sealed this 17th day of March 1970.

(SEAL)
Attest:

Edward M. Fletcher, Jr.

Attesting Officer

WILLIAM E. SCHUYLER, JR.
Commissioner of Patents